United States Patent [19]

Norsworthy

[11] Patent Number: 4,767,937
[45] Date of Patent: Aug. 30, 1988

[54] SCANNING SYSTEM WITH LOW SCAN RATE AND HIGH EFFECTIVE FRAME RATE

[75] Inventor: Keith H. Norsworthy, Bellevue, Wash.

[73] Assignee: The Boeing Company, Del.

[21] Appl. No.: 947,858

[22] Filed: Dec. 30, 1986

[51] Int. Cl.⁴ .............................................. H04N 1/10
[52] U.S. Cl. ..................................... 250/578; 358/293
[58] Field of Search ............... 250/203 R, 334, 342, 250/347, 349, 578; 244/3.16; 358/199, 213, 3.26, 293, 294, 113

[56] References Cited

U.S. PATENT DOCUMENTS

| | | | |
|---|---|---|---|
| 3,324,296 | 6/1967 | Powell | 250/203 R |
| 3,591,714 | 7/1971 | Guildford | 358/112 |
| 3,723,642 | 3/1973 | Laakmann | 358/166 |
| 4,017,732 | 4/1977 | Runciman | 250/334 |
| 4,054,797 | 10/1977 | Milton et al. | 250/332 |
| 4,155,007 | 5/1979 | Beckmann | 250/342 |
| 4,193,688 | 3/1980 | Watkins | 244/3.16 |
| 4,204,122 | 5/1980 | Menke | 250/334 |
| 4,262,199 | 4/1981 | Bridges et al. | 250/342 |
| 4,327,377 | 4/1982 | Takken | 250/334 |
| 4,403,148 | 9/1983 | Coon et al. | 250/334 |
| 4,560,869 | 12/1985 | Hien et al. | 250/235 |

Primary Examiner—David C. Nelms
Assistant Examiner—Stephone B. Allen
Attorney, Agent, or Firm—Finnegan, Henderson, Farabow, Garrett & Dunner

[57] ABSTRACT

A scanning sensor system scans a detector array across a field of view, the array comprising a plurality of infrared detector elements which are positioned in the array with spaces interspersed therebetween. The system scans separate detector elements across separate portions of the field of view at a slow scan rate and then rapidly steps to scan a different portion of the field of view, thereby permitting a high frame rate despite a low target sensing scan rate to lower the required total sample rate, reduce processing circuit complexity, and reduce the number of required interconnections between the focal plane array and on-gimbal processing circuitry.

14 Claims, 3 Drawing Sheets

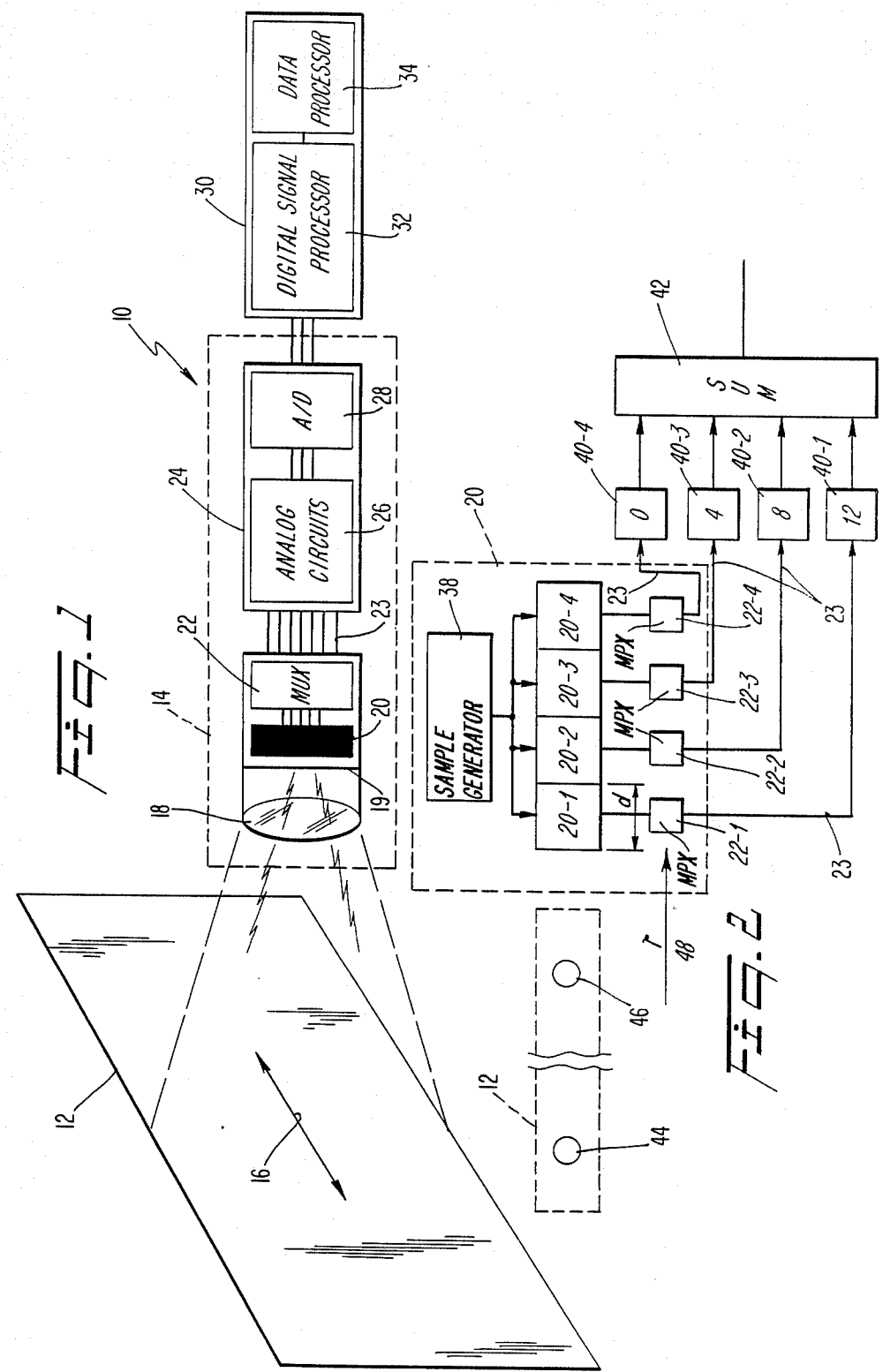

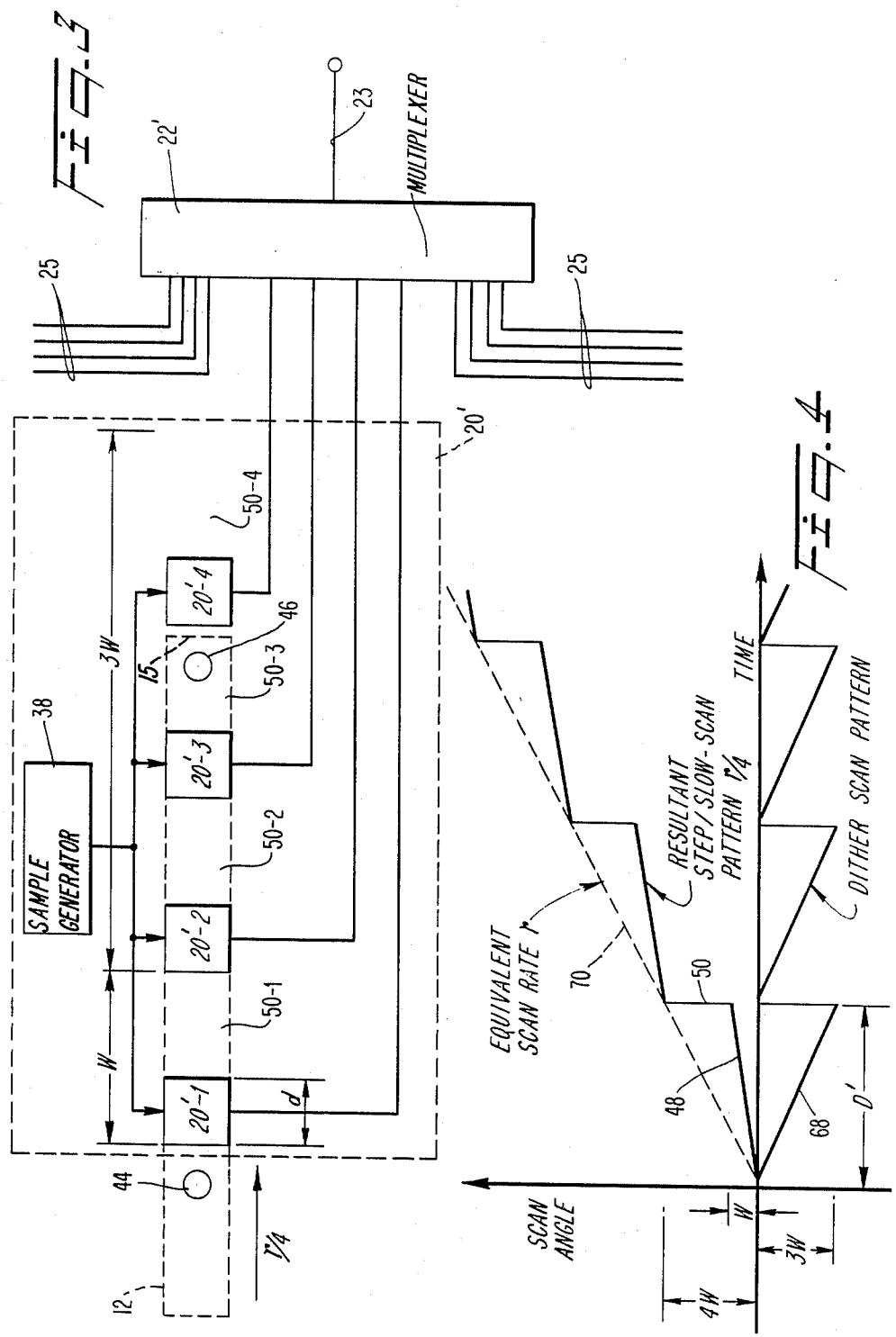

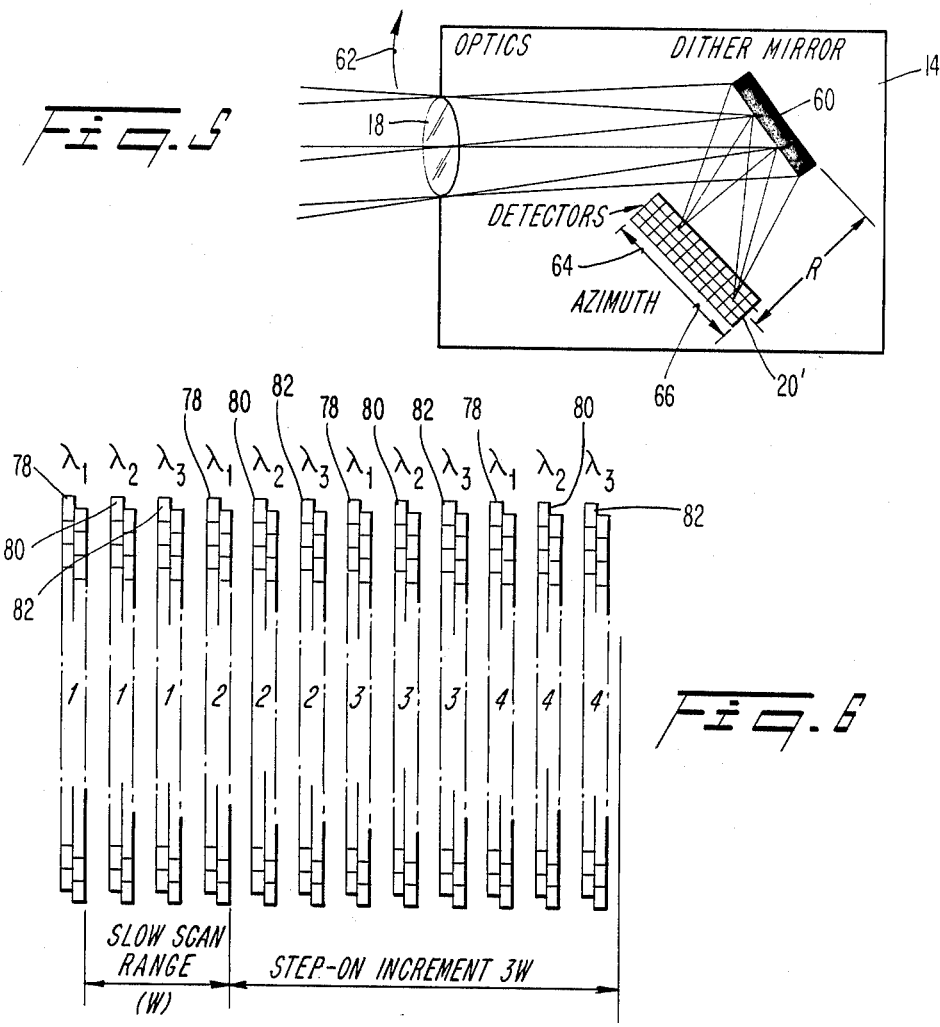
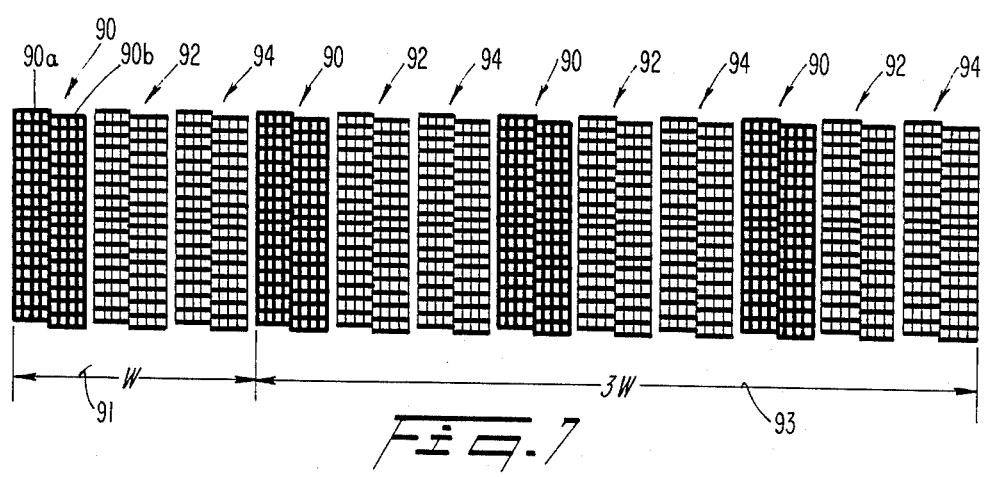

SCANNING SYSTEM WITH LOW SCAN RATE AND HIGH EFFECTIVE FRAME RATE

BACKGROUND

The invention relates to sensor systems and, more particularly, to scanning sensor systems.

Various types of sensor systems are known which can passively detect radiation, such as infrared radiation, emitted by objects within a field of view, analyze the position of such objects, and provide an output of information regarding the characteristics and movement of such objects. A first type of sensor system is known as a "staring" sensor system, in that the entire field of view is focused upon an array of infrared detector elements arranged in a matrix. The field of view remains focused in a stationary manner upon the detector array and the outputs from the various detectors are read out and processed. A staring sensor system provides maximum opportunity for detector elements to integrate the energy of infrared radiation impinging thereon, resulting in good sensitivity. However, the spatial sampling rate of staring type sensor systems is determined by the physical size of each detector element. Moreover, staring sensor systems typically handle only small fields of view on the order of two degrees by two degrees.

Scanning systems avoid some of the disadvantages of staring type systems. In such systems, radiation from a portion of the field of view is scanned across an array of detector elements, and the output signals of the detector elements are sampled and multiplexed for application to processing circuitry. The rate at which the full field of view can be processed is called the "frame rate." Spatial sample rate in scanning systems can be controlled by the detector signal sample rate and sensor scan rate. However, scanning sensor systems are also subject to disadvantages. In order to provide a rapid coverage of a desired field of view, it is necessary to scan the image across the detector element array at high speed. However, this reduces the dwell time of the image upon each individual detector element, thereby correspondingly reducing the amount of energy which can be integrated by each detector element to provide an output signal detectable above the noise level. Moreover, a high sampling rate is required to obtain the desired spatial resolution.

A reduction in sampling rate can be provided by slowing the scan rate of the system. However, sensor systems are typically employed where it is desired to monitor a field of view, detect a target, and return to the same position in the field of view to determine if the target has moved. It is additionally desirable to provide a high frame rate, that is, to rapidly return to an original field of view portion in order to detect variations, or modulations, in intensity of radiation emitted by the target, thus obtaining valuable information concerning the characteristics of the target. If the scan rate of scanning type sensors is slowed to permit longer integration times and slower sampling rates, this reduces the frame rate of the system, resulting in a corresponding reduction in the ability to frame-to-frame associate closely spaced objects and measure modulation of targets by comparing target characteristics on successive frames.

Various methods have been employed to increase the performance of scanning systems, one of which is known as time delay integration (TDI). In this technique, output signals produced by each detector element are sampled as the array is scanned, with the sampled output signals of adjacent detector elements being provided to time delay and summation circuitry. The signals produced by multiple detector elements are thus superimposed in time and summed to provide an increased signal to noise ratio compared to that of a single detector.

It is now possible to employ hundreds and even thousands of individual detector elements upon a focal plane array to provide increased performance using a scanning TDI system. However, such systems still require rapid sampling, which in turn produces an extremely high data output rate. Performance increases from large numbers of individual detector elements are thus limited by the complexity of processing circuitry required by such high data rates and by limitations on the number of interconnections which must be provided from the focal plane array to the off-array processing circuitry.

Another type of sensor system which has been proposed is known as a "step/stare" system. In this system, target object radiation collected by system optics is held stationary across an array or portion of an array of detector elements to permit the detector elements to integrate the received radiation. The entire matrix is then stepped to a different portion of the field of view and permitted to "stare" at, or integrate in a stationary manner, the radiation received from the new viewed portion of the field of view. A problem encountered in step/stare systems is that individual detector elements have non-identical response characteristics. That is, the threshold, gain, and frequency response of individual detector elements may vary. This variation causes undesired fluctuations in output signals known as pattern noise which is especially troublesome in step/stare systems. This and other problems, such as limited two-dimensional spatial sample rates, have combined to reduce the popularity of step/stare systems.

It is therefore an object of the present invention to provide a non-staring sensor system having a reduced sampling rate.

It is a further object of the present invention to provide a sensor system which reduces the interconnections between the focal plane array and associated processing circuitry.

It is yet another object of the present invention to provide a sensor system in which integration times for individual detector elements are increased while maintaining a high effective frame rate.

SUMMARY OF THE INVENTION

The present invention overcomes the problems and disadvantages of the prior art by providing a sensor system which scans across a portion of the field of view at a slow rate and then rapidly steps to a different portion of the field of view at a scan rate much higher than the slow scan rate, thereby producing a high effective average scan rate.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the scanning sensor system of this invention comprises a detector array including a plurality of detector elements each adapted when sampled to produce the detector output signal representative of the integrated energy of the radiation applied to the detector element since the detector element was last sampled. The invention further includes means for sampling the detector elements, and means coupled to each of the detector elements for producing a composite output signal representative of the detector output signals. The invention also comprises means for scanning the array across a desired field of view with the scanning means scanning the array a first distance at a first rate and subsequently scanning the array a second distance at a second rate higher than the first rate.

The accompanying drawings, which are incorporated in and constitute a part of the specification, illustrate one embodiment of the invention and, together with the description, serve to explain the principles of the invention.

BRIEF DESCRIPTION OF THE DRAWINGS

FIG. 1 is a block diagram of a scanning sensor system which may incorporate the principles of the present invention;

FIG. 2 is a detailed block diagram of components of the apparatus of FIG. 1 operating according to the principles of the prior art;

FIG. 3 is a block diagram of an array of detector elements which incorporates the principles of the present invention;

FIG. 4 is a graph showing the resultant scan pattern of the invention;

FIG. 5 is a schematic diagram of a mechanism which may be employed to incorporate the principles of a preferred embodiment of the present invention;

FIG. 6 is a block diagram of a detector element array constituting a first alternative embodiment of the present invention; and FIG. 7 is a block diagram of a detector element array constituting a second alternative embodiment of the present invention.

DESCRIPTION OF THE PREFERRED EMBODIMENT

Reference will now be made in detail to the present preferred embodiment of the invention, an example of which is illustrated in the accompanying drawings. In the drawings, corresponding reference characters refer to corresponding elements.

FIG. 1 shows a scanning system 10 designed to detect objects at extended distances over a two-dimensional field of view 12. System 10 includes a sensor unit 14 movably mounted on gimbals (not shown) so as to scan in a direction indicated by arrow 16 to cover field of view 12. Sensor unit 14 includes an optical system indicated schematically at 18 which projects a portion of field of view 12 onto a focal plane 19. Positioned at focal plane 19 is an array 20 of infrared detector elements and associated processing circuitry. Typical arrays 20 may consist of hundreds or even thousands of individual detector elements.

The output of detector elements of array 20 are connected through multiplexing circuitry 22 over interconnect cables 23 to circuitry 24. Circuitry 24 is mounted in movable sensor unit 14 and is thus referred to as on-gimbal circuitry. On-gimbal circuitry 24 includes analog signal processing circuitry 26 which amplifies and processes signals received over interconnect cables 23 to provide the highest possible signal to noise ratio. The output of analog circuitry 26 is then supplied to analog-to-digital converter circuitry 28 which converts the signals to digital quantities and transmits data from sensor unit 14 to off-gimbal processing circuitry 30 which may include a digital signal processor 32 and additional data processing circuitry 34 for analyzing information obtained by sensor unit 14.

Referring now to FIG. 2, there is shown a more detailed view, in schematic form, of a prior art TDI array 20 positioned in the focal plane 19 of optical system 18. As can be seen in FIG. 2, array 20 includes a plurality of individual adjacent detector elements 20-1, 20-2, 20-3, and 20-4. Array 20 also includes a sample generator 38 which provides sampling signals of identical frequency, sampling interval, and sampling time phases to detector elements 20-1 through 20-4. Each detector element 20-1 through 20-4 is adapted when sampled to produce a detector output signal value representative of the integrated energy of radiation applied to the detector element since the detector element was last sampled.

The outputs of each detector element 20-1 through 20-4 are supplied to respective multiplexer units 22-1 through 22-4. Although only a single row of detector elements are shown in FIG. 2, it is to be understood that in practice each single detector element will represent a column of detector elements to scan a wide vertical slice of field of view 12. The outputs of each detector element in a column are supplied to a respective multiplexer unit 22-1 through 22-4 and combined for output on a respective cable 23.

Detector output signal values from multiplexer units 22-1 through 22-4 are applied through delay elements 40-1, 40-2, 40-3, and 40-4 to a summation circuit 42. In a well known manner, delay elements 40-1 through 40-4, which may constitute shift registers, each have a delay value representative of the position of the connected detector element in array 20. As shown in FIG. 2, delay elements 40-1 through 40-4 have delay values which are integer multiples of the sampling interval of sampling signals produced by generator 38. Specifically, delay elements 40-1 through 40-4 have delay values which are respectively equal to twelve, eight, four, and zero times the sampling interval.

As shown in FIG. 2, field of view 12 may include targets which emit infrared radiation. This radiation is formed by optics 18 into blur spots, for example, blur spots 44 and 46. Movement of sensor unit 14 is operative to scan detector elements 20-1 through 20-4 across field of view 12 at a scan rate r. Radiation from field view 12 including blur spots 44 and 46 thus has relative motion across detector elements 20-1 through 20-4 in the direction indicated by arrow 48 at scan rate r. Each detector element 20-1 through 20-4 has a width d. It can therefore be seen that radiation from an object in field of view 12 will be applied to each individual detector element with a dwell time, and time of separation, $D=d/r$. In the example shown in FIG. 2, generator 38 provides four samples during the time that blur spot 46 is scanned over each detector element width. That is, sample interval s is equal to D/4.

In a well known manner, the structure of FIG. 2 provides time delay integration to superimpose signals produced by detector elements 20-1 through 20-4 to provide increased signal to noise ratio. Advances in technology have provided the capability to include hundreds or even thousands of individual detector elements within array 20, producing a corresponding increase in sensor performance. However, the TDI technique requires relatively high sample rates, and with increasing numbers of detector elements, the total effective sample rate becomes extremely large. This requires correspondingly complex processing circuitry and a large number of multiplexer units 22-1 through 2-4 and associated interconnect cables 23 to transmit data generated by the detector elements from the focal plane to the on-gimbal circuitry. In fact, the large number of interconnections serves as the limiting factor in increasing sensor performance.

A slower sampling rate would alleviate problems of processing circuitry complexity and interconnection limitations. However, a waveform produced by detector elements of array 20 by a target has a characteristic frequency component. According to the Nyquist theorem, a waveform must be sampled at a rate at least twice its characteristic frequency in order to successfully reproduce the waveform. Accordingly, reduced sampling rate scanning systems run the risk of a reduction in performance due to the signal frequency folding phenomenon that results from violation of the Nyquist theorem.

Slowing the scan rate would alleviate problems of processing circuitry complexity and interconnection limitations. However, a reduction in scan rate would cause a corresponding reduction in frame rate, that is, the ability to completely cover the field of view and return to the original position for a "second look" at a portion of the field of view. Since scanning systems are typically employed in larger detection systems which process detector array outputs using a variety of algorithms to spot target motion and characteristics associated with certain types of targets, a high frame rate is essential to provide proper execution of these tracking and analysis algorithms. Accordingly, reduction of the scan rate is not an acceptable solution to the problems of processing circuitry complexity and interconnection limitations.

Referring now to FIG. 3, there is shown in schematic form a detector element array 20' which constitutes a preferred embodiment of the present invention. As can be seen in FIG. 3, array 20' includes the same number of detector elements 20'-1, 20'-3, 20'-3, and 20'-4 as prior art array 20. As in array 20, each detector element 20'-1 through 20'-4 represents a column of multiple detector elements stacked vertically. However, instead of having each detector element, or column, formed adjacent each other in the scan direction, the detector elements of array 20' are separated from each other by spaces 50-1, 50-2, 50-3, and 50-4. For purposes of explanation, it can be seen in FIG. 3 that, prior to the initiation of a scan operation, the right edge 15 of a portion of field of view 12 is positioned immediately in front of detector element 20'-4, in contrast to the prior art as shown in FIG. 2, wherein the right edge of the portion of field of view 12 is positioned immediately in front of detector element 20-1.

The invention includes means for sampling the detector elements. As embodied herein, the sampling means comprises sample generator 38. In response to signals from generator 38, detector elements 20'-1 through 20'-4 provide detector output signal values. These detector output signals are supplied to multiplexing circuitry 22 where they are time multiplexed onto a single output 23 from which processing continues in a similar manner to the prior art.

In a scanning operation employing the principles of the present invention, array 20' is scanned across field of view 12 such that during a first portion of the scanning operation array 20' is scanned at a first rate and during a second portion of the scanning operation array 20' is scanned at a second rate higher than the first rate. In a preferred embodiment as shown in FIG. 3, radiation, such as blur spot 44, has relative motion with respect to array 20' across a first distance W, including detector element 20'-1, at a rate equal to r/4, where r is the scan rate of the apparatus shown in FIG. 2. It can therefore be seen that dwell time D' on each detector element of array 20' is equal to d/(r/4), which is equal to 4d/r. Thus, the dwell time for detector elements of array 20' is four times longer than the dwell time of detector elements 21 of array 20. This slower scan rate permits a lower sample rate which allows a simpler multiplexing circuitry, as indicated by single unit 22', and fewer cables 23. It also allows longer integration times. This in turn leads to a single detector signal to noise ratio which is comparable to a four detector TDI scan signal to noise ratio as shown in FIG. 2. It can be further seen in FIG. 3 that separate ones of detector elements 20'-1 through 20'-4 are scanned across separate parts of field of view 12. For example detector element 20'-1 is scanned across blur spot 44 and detector element 20'-4 is scanned across blur spot 46.

The invention includes means coupled to each of the detector elements for producing a composite output signal representative of the detector output signals. As embodied herein, the siqnal producing means comprises multiplexing circuitry 22'.

Although only four detector elements 20'-1 through 20'-4 arranged in a row are shown in FIG. 3, it is to be understood that array 20' generally includes a plurality of rows of detector elements stacked vertically to form a matrix of rows and columns. Signals from other rows of four detector elements are supplied to multiplexing circuitry 22' via connectors 25 of FIG. 3. The number of groups of connectors 25 supplied to multiplexing circuitry 22' is equal to the number of rows provided in the matrix which comprises array 20'.

Following the scan at rate r/4, sensor unit 14 executes a rapid discontinuous step scan to cause array 20' to be stepped across a distance 3W in field of view 12, resulting in apparent motion of blur spots 44 and 46 across a distance 3W as shown in FIG. 3.

FIG. 4 is a graph showing the resultant scan pattern of the preferred embodiment shown in FIG. 3. The horizontal axis of FIG. 4 represents time and the vertical axis represents scanned angle. As can be seen in FIGS. 3 and 4, a scan angle W is scanned during a time period D'. At the expiration of time period D', sensor unit 14 executes a discontinuous step across second angular distance 3W. This operation can be seen in the graph of FIG. 4 which shows a slow scanning portion 48 followed by a step portion 50. As can be seen in FIG. 4, the resultant combination of the slow scan portion and the step portion results in an effective scan rate equal to r.

This step/slow scan operation permits each detector element of array 20' to integrate over a longer dwell time D'. This provides a single detector signal to noise ratio comparable to the four detector TDI sum signal to noise ratio achieved by the prior art of FIG. 2. The lower sample rate per detector in array 20' reduces the number of required multiplexers and accompanying cables 23. In effect, a single detector element of an array 20' incorporating the principles of the invention "looks at" a target for a long period of time, whereas in the prior art TDI techniques, several detector elements observed the radiation from the target for short periods of time. It is to be noted that only a part of field of view 12 is scanned across detector element 20'-1. Adjacent parts of field of view 12 are simultaneously scanned at the rate r/4 across detector element 20'-2. Similarly, third and fourth parts of field of view 12 are simultaneously, concurrently, and respectively scanned across portions of array 20' consisting of detector element 20'-3 and detector element 20'-4. Thus, in the prior art, each section of field of view 12 is rapidly scanned across several detectors in array 20 whereas in array 20' incorporating the principles of the present invention, each position in the field of view 12 is scanned at a slower rate across a single detector element.

The invention thus includes means for scanning the array across a desired field of view 12, the scanning means scanning the array a first distance at a first rate and subsequently scanning a second distance at a second rate higher than the first rate. The scanning means is incorporated in a preferred embodiment of the invention as shown in FIG. 5. Sensor unit 14 includes a dither mirror 60. Radiation from field of view 12 is applied by optics 18 to dither mirror 60 where it is reflected onto array 20'. Rotation of sensor unit 14 in the direction indicated by arrow 62 is operative to scan radiation across array 20' in the direction shown by arrow 64 at a rate r at the focal plane. However, dither mirror 60 is pivotally mounted on an axis parallel to the axis of rotation of sensor unit 14 and perpendicular to the plane of FIG. 5. Dither mirror 60 rotates in an oscillatory manner in a direction opposite to that of sensor unit 14 at a rate 3r/4 at the focal plane, thus tending to scan radiation across array 20' in a direction indicated by arrow 66. Thus, a blur spot formed by optics 18 and reflected by dither mirror 60 onto array 20' will be scanned in a direction 64 at a rate resulting from the combination of the oppositely directed rotations of sensor unit 14 and dither mirror 60. That is, the effective scan rate of radiation across array 20' is r-3r/4=r/4. When dither mirror 60 rotates sufficiently far to cause a scan of distance W in FIG. 3, it rapidly rotates in an opposite direction, causing a discontinuous step scan to view a different portion of field of view 12.

The oscillatory rotation of dither mirror 60 is indicated by curve 68 in FIG. 4. As can be seen in FIG. 4, dither mirror 60 rotates in a negative scan angle direction to cover a distance 3W during a time period D'. Since sensor unit 14 is rotating at a rate r in a positive direction, and since unit 14 covers a distance of 4w over a period D', the resultant effective scan of radiation across array 20' is shown by curves 48 and 50 in FIG. 4.

Dither mirror 60 requires a finite time to reset, typically 10% of the step period. This means that the information gathering time of the sensor system is reduced by a multiplicative factor of 0.90. As a result, the sample rate is increased by 10% and the output signal to noise ratio is decreased by 5% to 10% from the theoretical maximum.

Various other scanning means may be provided for scanning radiation across a first distance of array 20' at a first rate and over a second distance in array 20' at a second rate higher than the first rate. For example, sensor unit 14 may itself be rotated at two rates to provide the step/slow-scan feature described above. Alternatively, a continuously rotating faceted mirror may be employed to provide the step/slow-scan feature described above.

Since each detector element in array 20' has a dwell time D' which is four times longer than dwell time D of corresponding prior art TDI systems shown in FIG. 2, the sampling rate of detector elements in array 20' may be correspondingly reduced by a factor of 4. This permits a reduction in the complexity of circuitry necessary to process data from array 20' and reduces the number of interconnections 23 between multiplexer 22 and on-gimbal circuitry 24.

In the embodiment shown in FIG. 3, the scanning means scans separate ones of the detector elements across separate portions of field of view 12. With a ratio of slow scan distance W to step scan distance 3W equal to 1/(N−1), where N equals the number of detector elements in array 20'. This results in each portion of field of view 12 being scanned by only one detector element. In some applications, such as when single-scan target velocity or target amplitude modulation rate is desired, it may be preferable to view each portion of the field of view twice in quick succession during each field of view scan. This can be accomplished by setting the ratio of slow scan distance to step scan distance equal to 2/(N−2) or, in the case of the embodiment shown in FIG. 3, setting the slow scan distance and the step scan distance equal to 2W.

In a first alternative embodiment, individual detectors 20'-1 through 20'-4 may be replaced by staggered columns 78 of detector elements, as shown in FIG. 6, to provide the well known increase in cross-scan spatial sampling rate. Although an apparent disadvantage of the step/slow-scan feature of the present invention is that detector arrays having an equal number of detector elements as the prior art appear to occupy a larger surface area in the focal plane and thus require wider angle optics, practical prior art scanners incorporate a plurality of separate arrays responsive to different wavelengths in order to properly monitor the characteristics of objects of interest within the field of view. Such additional arrays would occupy additional area in the focal plane. Multiple wavelength response may be provided in the present invention as also shown in FIG. 6, wherein staggered pairs 80 and 82, respectively responsive to wavelengths $WL_2$ and $WL_3$, are interspersed in spaces between original staggered column pairs 78 having a response of $WL_1$. It can be seen, therefore, that the present invention provides a multiple wavelength response scanning system which does not occupy significantly more focal plane area than TDI systems of the prior art yet which utilizes a slower effective scan.

Although the step/slow scan arrangement of the present invention provides significant advantages over prior art systems employing only TDI techniques, it may be desirable in certain applications to provide apparatus including a combination of the step/slow scan feature of the previously described embodiment and small groups of adjacently located TDI detector elements. That is, each of the individual detector elements shown with respect to the embodiment of FIG. 3 may be replaced by small groups of adjacently positioned detector elements with associated TDI delay and summation circuitry.

It may be further desirable to combine the step/slow-scan features of the previously described embodiment of the present invention with the techniques described in copending U.S. patent application, Ser. No. 947,359, entitled SCANNING SYSTEM WITH LOW SAMPLE RATE, filed Dec. 30, 1986 by Keith H. Norsworthy and assigned to the assignee of the present invention. An embodiment employing such combination of features is shown in FIG. 7. As in FIG. 6, only the layout of detector elements is shown, for purposes of clarity. It is to be understood that the embodiments of FIGS. 6 and 7 include multiplexing and related processing circuitry according to the principles previously discussed, as will be readily apparent to those skilled in the art.

As can be seen in FIG. 7, a plurality of detector arrays 90, 92, and 94 are positioned in focal plane 19. Each array 90, 92, and 94 is responsive to a different wavelength of infrared radiation. Each array 90, 92, and 94 includes a pair of subgroups 90a, 90b, 92a, 92b, and 94a, 94b, respectively, offset in the cross scan (vertical) direction by one-half the detector width to provide the staggered configuration previously described as having increased cross-scan spatial sampling rate. Each column of detector elements in groups 90, 92, and 94 is supplied through a column multiplexer circuit to delay lines having delay values proportional to the position of a connected column within the corresponding detector group. If the detector elements of each group are sampled in phase and the output from each delay line is supplied to a summation circuit, each group 90, 92, and 94 comprises a time delay integration (TDI) group. If each detector element in a group is sampled and delayed such that the output of each delay line is out of time phase and supplied to a multiplexer to provide discrete time multiplexed signals corresponding to the delayed sample values from detector elements of connected columns, each group comprises a low sample rate group as defined in the aforementioned copending U.S. patent application. This low sample rate technique is described in greater detail in the aforementioned copending U.S. patent application entitled SCANNING SYSTEM WITH LOW SAMPLE RATE, the disclosure of which is hereby expressly incorporated by reference.

In the embodiment of FIG. 7, radiation from a portion of field of view 12 is scanned across a first distance 91 having a scan angle W. The viewed portion of the field of view is then stepped forward over the second distance 93 having a scan angle 3W.

In this manner, the step/slow scan feature can be combined with other techniques to reduce signal processing complexity and reduce required interconnections from the focal plane array to on-gimbal electronics.

The slow-scan angle W in FIGS. 6 and 7 is normally set equal to the angular increment between groups having identical spectral response. As discussed previously, it is desirable in some applications to view each portion of the field of view twice in quick succession during each field of view scan. This can be accomplished either by increasing the slow scan width 91 from W to 2W and decreasing the step scan distance to 2W, or by reducing the step-on distance 93 from 3W to W, in the embodiment of FIG. 7, that is, by setting the ratio of slow scan distance to step scan distance equal to 2/(N−2).

It will be apparent to those skilled in the art that various modifications and variations can be made to the scanning system and method of the present invention without departing from the scope and spirit of the invention. Thus it is intended that the present invention cover the modifications and variations of this invention, provided that they come within the scope of the appended claims and their equivalents.

I claim:

1. A scanning sensor system, comprising:
   a detector array including a plurality of detector elements each adapted when sampled to produce a detector output signal representative of the integrated energy of radiation applied to said detector element since said detector element was last sampled;
   means for sampling said detector elements;
   means coupled to each of said detector elements for producing a composite output signal representative of said detector output signals; and
   means for scanning said array across a desired field of view, said scanning means scanning said array a first distance across said field of view in a first direction at a first rate and scanning said array a second distance across said field of view in a direction parallel to said first direction at a second rate higher than said first rate.

2. A system as recited in claim 1 wherein said array comprises a plurality of time delay integration groups of detector elements.

3. A system as recited in claim 1 wherein said detector elements are separated from each other by spaces.

4. A system as recited in claim 3 wherein said scanning means scans separate ones of said detector elements across separate portions of said field of view.

5. A system as recited in claim 4 wherein said array comprises a plurality of groups of detector elements, detector elements of each group being responsive to radiation of a different wavelength.

6. A system as recited in claim 5 wherein said scanning means scans a plurality of groups of detector elements responsive to the same wavelength across said first distance.

7. A system as recited in claim 5 wherein the ratio of said first distance to said second distance is 1/N where N is the number of said detector elements.

8. A system as recited in claim 5 wherein the ratio of said first distance to said second distance is 2/(N−2) where N is the number of said detector elements.

9. A scanning sensor system, comprising:
   a detector array including a plurality of spaced detector elements each adapted when sampled to produce a detector output signal value representative of the integrated energy of radiation applied to said detector element since said detector element was last sampled, said detector elements being arranged in groups of adjacent detectors, said groups being separated from each other by spaces;
   means for sampling said detector elements;
   means coupled to each of said detector elements for producing a composite output signal representative of said detector output signals; and
   means for scanning said array across a desired field of view, said scanning means scanning said array a first distance across said field of view in a first direction at a first rate and scanning said array a second distance across said field of view in a direction parallel to said first direction at a second rate higher than said first rate, said scanning means scanning separate ones of said groups across separate portions of said field of view.

10. A scanning sensor system as recited in claim 9 wherein said sampling means generates sampling signals for detector elements in each of said groups which are identical in frequency and have a predetermined time phase relationship; and said groups each comprise a plurality of delay means each connected to one of said detector elements for delaying said detector output signal value of said connected detector element by a predetermined delay value, said time phase relationships and said delay value being related such that said delayed output signal values are out of time phase and multiplexer means connected to each of said delay means for time multiplexing said delayed detector signal values as discrete signals on a single multiplexer output terminal.

11. A method for sensing radiation from a field of view, comprising the steps of:
scanning a detector array in a first direction across a first portion of a desired field of view at a first rate, said detector array including a plurality of detector elements each adapted when sampled to produce a detector output signal representative of the integrated energy of said radiation applied to said detector element since said detector element was last sampled;
sampling said detector elements;
producing a composite output signal representative of said detector output signals; and
scanning said array in a direction parallel to said first direction across a second portion of said field of view at a second rate higher than said first rate.

12. A method as recited in claim 11 wherein:
said first scanning step comprises the substep of scanning separate parts of said array consisting of groups of adjacent detector elements across respective separate portions of said field of view at said first rate;
said sampling step comprises the substep of sampling detector elements of each group with sampling signals identical in frequency and having a predetermined phase value; and
said producing step comprises the substeps of delaying said detector output signals such that said delayed output signals are out of time phase and time multiplexing said delayed detector output signals from each detector element in a group to produce a series of discrete multiplexed output signals on a single multiplexor output terminal from each group.

13. A method as recited in claim 11 wherein said first scanning step includes the substep of scanning separate parts of said array across respective separate portions of said field of view at said first rate.

14. A method as recited in claim 13 wherein:
said first scanning step comprises the substep of scanning separate parts of said array consisting of groups of adjacent detector elements across respective separate portions of said field of view at said first rate;
said sampling step comprises the substep of sampling the detector elements of each group in phase; and
said producing step comprises the substeps of delaying said detector output signals and summing said detector output signals from each detector element group to produce an output signal from each group which is superimposed in time.

* * * * *